US009158172B2

(12) United States Patent
Sbar et al.

(10) Patent No.: US 9,158,172 B2
(45) Date of Patent: Oct. 13, 2015

(54) COLOR MATCHED COATING FOR BUS BARS

(71) Applicant: SAGE Electrochromics, Inc., Faribault, MN (US)

(72) Inventors: Neil L. Sbar, Northfield, MN (US); Jean-Philippe Savary, Northfield, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 140 days.

(21) Appl. No.: 13/798,520

(22) Filed: Mar. 13, 2013

(65) Prior Publication Data

US 2014/0133005 A1    May 15, 2014

Related U.S. Application Data

(60) Provisional application No. 61/726,146, filed on Nov. 14, 2012.

(51) Int. Cl.
| G02F 1/153 | (2006.01) |
| H02G 5/00 | (2006.01) |
| B32B 17/10 | (2006.01) |
| G02F 1/161 | (2006.01) |
| E06B 9/24 | (2006.01) |
| G02F 1/163 | (2006.01) |
| G02F 1/155 | (2006.01) |

(52) U.S. Cl.
CPC .......... *G02F 1/153* (2013.01); *B32B 17/10055* (2013.01); *B32B 17/10513* (2013.01); *E06B 9/24* (2013.01); *G02F 1/161* (2013.01); *E06B 2009/2464* (2013.01); *G02F 1/155* (2013.01); *G02F 1/1533* (2013.01); *G02F 1/163* (2013.01); *G02F 2001/1536* (2013.01); *G02F 2001/1555* (2013.01); *G02F 2202/00* (2013.01)

(58) Field of Classification Search
CPC ......... G02F 1/163; G02F 1/155; G02F 1/153; G02F 1/161; G02F 1/1533; G02F 2001/1555; G02F 2001/1536; G02F 2202/00
USPC ............. 359/265–275; 174/70 B, 71 B, 72 B, 174/88 B, 99 B, 68.2
See application file for complete search history.

(56) References Cited

U.S. PATENT DOCUMENTS

| 6,118,573 | A  | * | 9/2000 | Kubo et al. | ................... 359/266 |
| 8,213,074 | B1 | * | 7/2012 | Shrivastava et al. | .......... 359/275 |

(Continued)

FOREIGN PATENT DOCUMENTS

WO    2012162502 A1    11/2012

OTHER PUBLICATIONS

International Search Report and Written Opinion for Application No. PCT/US2013/070129 dated Feb. 21, 2014.

(Continued)

*Primary Examiner* — Evelyn A Lester
(74) *Attorney, Agent, or Firm* — Abel Law Group, LLP; Robert N Young

(57) ABSTRACT

In one aspect, the present invention is a system comprising an electrochromic device having at least one bus bar and a color obscuration material wherein the at least one bus bar is coated with an over-coating material that is 1) substantially non-porous; and 2) substantially color-matched to one of said color obscuration material, a spacer, or a polymer seal.

42 Claims, 5 Drawing Sheets

(56) References Cited

U.S. PATENT DOCUMENTS

| | | |
|---|---|---|
| 2002/0024544 A1 | 2/2002 | Codos |
| 2002/0075552 A1* | 6/2002 | Poll et al. .................. 359/275 |
| 2002/0135881 A1* | 9/2002 | Rukavina et al. ............ 359/609 |
| 2003/0129416 A1 | 7/2003 | Patz et al. |
| 2004/0061920 A1 | 4/2004 | Tonar et al. |
| 2005/0195488 A1 | 9/2005 | McCabe et al. |
| 2006/0283084 A1* | 12/2006 | Johnson .............................. 49/1 |
| 2007/0133078 A1* | 6/2007 | Fanton et al. ................. 359/265 |
| 2009/0181203 A1* | 7/2009 | Valentin et al. ................ 428/38 |
| 2010/0067090 A1 | 3/2010 | Egerton et al. |
| 2010/0245973 A1* | 9/2010 | Wang et al. .................. 359/275 |
| 2011/0048614 A1 | 3/2011 | Veerasamy |
| 2011/0051221 A1* | 3/2011 | Veerasamy .................. 359/275 |
| 2011/0059275 A1* | 3/2011 | Stark .............................. 428/34 |
| 2012/0147449 A1 | 6/2012 | Bhatnagar et al. |
| 2012/0300280 A1 | 11/2012 | Murphy et al. |

OTHER PUBLICATIONS

International Search Report and Written Opinion for Application No. PCT/US2012/039346, dated Jul. 31, 2012, 12 pages.

Non-Final Office Action for U.S. Appl. No. 13/479,781, mailed Nov. 20, 2014, 12 pages.

\* cited by examiner

COLOR MATCHED COATING FOR BUS BARS

CROSS-REFERENCE TO RELATED APPLICATIONS

The present application claims the benefit of the filing date of U.S. Provisional Patent Application No. 61/726,146 filed Nov. 14, 2012, the disclosure of which is hereby incorporated herein by reference

FIELD OF THE INVENTION

The present application relates to quality and performance enhancements related to electrochromic insulating glass units.

BACKGROUND OF THE INVENTION

Electrochromic glazings include electrochromic materials that are known to change their optical properties, such as coloration, in response to the application of an electrical potential, thereby making the device more or less transparent or more or less reflective. Typical prior art electrochromic devices (hereinafter "EC devices") include a counter electrode layer, an electrochromic material layer which is deposited substantially parallel to the counter electrode layer, and an ionically conductive layer separating the counter electrode layer from the electrochromic layer respectively. In addition, two transparent conductive layers are substantially parallel to and in contact with the counter electrode layer and the electrochromic layer. Materials for making the counter electrode layer, the electrochromic material layer, the ionically conductive layer and the conductive layers are known and described, for example, in United States Patent Publication No. 2008/0169185, incorporated by reference herein, and desirably are substantially transparent oxides or nitrides.

Traditional EC devices and the insulated glass units (hereinafter "IGUs") comprising them have the structure shown in FIG. 1. As used herein, the term "insulated glass unit" means two or more layers of glass separated by a spacer 1 (metal, plastic, foam, resin based) along the edge and sealed (seal not depicted) to create a dead air space, "insulated space" (or other gas, e.g. argon, nitrogen, krypton) between the layers. The IGU 2 comprises an interior glass panel 3 and an EC device 4, described further herein.

FIGS. 2 and 3 illustrate plan and cross-sectional views, respectively, of a typical prior art electrochromic device 20. The device 20 includes isolated transparent conductive layer regions 26A and 26B that have been formed on a substrate 34. The EC device 20 includes a counter electrode layer 28, an ion conductive layer 32, an electrochromic layer 30 and a transparent conductive layer 24, which have been deposited in sequence over the conductive layer regions 26. Further, the device 20 includes a bus bar 40 which is in contact only with the conductive layer region 26A, and a bus bar 42 which may be formed on the conductive layer region 26B and is in contact with the conductive layer 24. The conductive layer region 26A is physically isolated from the conductive layer region 26B and the bus bar 42, and the conductive layer 24 is physically isolated from the bus bar 40. Further, the bus bars 40 and 42 are connected by wires to positive and negative terminals, respectively, of a low voltage electrical source 22.

Referring to FIGS. 2 and 3, when the source 22 is operated to apply an electrical potential across the bus bars 40, 42, electrons, and thus a current, flows from the bus bar 42, across the transparent conductive layer 24 and into the electrochromic layer 30. Further, ions, such as Li+ stored in the counter electrode layer, flow from the counter electrode layer 28, through the ion conductive layer 32, and to the electrochromic layer 30, and a charge balance is maintained by electrons being extracted from the counter electrode layer 28, and then being inserted into the electrochromic layer 30 via the external circuit. The transfer of ions and electrons to the electrochromic layer causes the optical characteristics of the electrochromic layer, and optionally the counter electrode layer in a complementary EC device, to change, thereby changing the coloration and, thus, the transparency of the EC device. It is desirable to position the bus bars near the sides of the device 20, where the bus bars, which typically have a width of not more than about 0.25 inches, are not visible or are minimally visible, such that the device is aesthetically pleasing when installed in a typical window frame.

It is often necessary for the bus bar material to extend beyond the IGU seal such that an electrical connection can be made outside the IGU. An internal connection to the transparent conductor layer would, it is believed, compromise the aesthetics of the EC device. Moreover, the typical low temperature bus bar materials employed in the art, e.g. silver-based thick film frit materials, are believed to be porous. As a result, there is believed to be at least a partial leakage of the inert gas stored in the dead air space of the IGU when traditional frit materials are extended outside the IGU under the spacer.

In addition, traditional electrochromic IGU constructions have certain deficiencies with regards to the visual aspect of the bus bars. There is a generally a black obscuration layer around the perimeter of the glass substrates to block the transmission of stray light. However, as seen from the inside, the product fabrication and assembly is such that the shiny silver bus bars can be seen with the black obscuration print in the background. The color difference may be striking and may attract some attention.

BRIEF SUMMARY OF THE INVENTION

In one aspect, the present invention is a system comprising an electrochromic device having at least one bus bar and a color obscuration material wherein the at least one bus bar is coated with an over-coating material that is 1) substantially non-porous; and 2) substantially color-matched to one of said color obscuration material, a spacer, or a polymer seal.

In some embodiments, the substantially non-porous, color-matched over-coating material is an ink. In some embodiments, the system further comprises a spacer, wherein the ink provides electrical insulation between the spacer and the at least one bus bar. In some embodiments, the ink masks the porosity of the at least one bus bar and increases inert gas retention performance. In some embodiments, the system further comprises a solder pad, wherein the ink acts as a solder stop by not covering said solder pad.

In some embodiments, the ink completely covers all exposed bus bar surfaces in the IGU. In some embodiments, the ink completely covers the bus bar area under the spacer. In some embodiments, the ink completely covers a distance beyond the spacer. In some embodiments, the distance is between 0.5 mm and 1.5 mm. In some embodiments, the ink is selected from the group consisting of an organic acrylate ink and a modified silicone ink. In some embodiments, the ink has an optical density greater than about 2 for a thin section less than about 0.005" thick.

In some embodiments, the at least one bus bar is at least partially comprised of silver or a silver based material. In some embodiments, the at least one bus bar is metallic or silver in color.

In some embodiments, the at least one bus bar is substantially obscured due to color matching between the over-coating and the color of said spacer and/or adhesive. In some embodiments, the at least one bus bar is located adjacent to the spacer. In some embodiments, the at least one bus bar is centrally located within the IGU.

In a further aspect, the present invention is an insulated glass unit comprising an electrochromic device having at least two bar bars and a color obscuration material, wherein said bus bars are coated with an over-coating material that is 1) substantially non-porous; and 2) substantially color-matched to one of said color obscuration material, a spacer, or a polymer seal.

In some embodiments, the non-porous color-matched over-coating material is an ink. In some embodiments, the system further comprises a spacer, wherein the ink provides electrical insulation between the spacer and the bus bars. In some embodiments, the ink masks the porosity of the bus bars and increases inert gas retention performance. In some embodiments, the system further comprises a solder pad, wherein the ink acts as a solder stop by not covering the solder pad.

In some embodiments, the ink completely covers all exposed bus bar surfaces in the IGU. In some embodiments, the ink completely covers the bus bar area under the spacer. In some embodiments, the ink completely covers a distance beyond the spacer. In some embodiments, the distance is between 0.5 mm and 1.5 mm. In some embodiments, the ink is selected from the group consisting of an organic acrylate ink and a modified silicone ink. In some embodiments, the ink has an optical density greater than about 2 for thin section less than about 0.005" thick.

In some embodiments, the bus bars are at least partially comprised of silver or a silver based material. In some embodiments, the bus bars are metallic or silver in color.

In some embodiments, the bus bars are substantially obscured due to color matching between the over-coating and the color of said spacer and/or adhesive. In some embodiments, the bus bars are located adjacent to the spacer. In some embodiments, the bus bars are centrally located within the IGU.

In a further aspect, the present invention comprises a method of increasing the inert gas retention performance of an electrochromic device including at least one bus bar and a color obscuration material comprising at least partially coating the at least one bus bar with an over-coating material that is 1) substantially non-porous; and 2) substantially color-matched to one of said color obscuration material, a spacer, or a polymer seal.

In some embodiments, the substantially non-porous over-coating material is selected from the group consisting of an organic acrylate based ink and a modified silicone ink. In some embodiments, the inert gas retention is at least about 90% over 30 days. In some embodiments, the inert gas retention is at least about 90% over 45 days. In some embodiments, the inert gas retention is at least about 95% over 30 days. In some embodiments, the inert gas retention is at least about 95% over 45 days. In some embodiments, the at least one bus bar is obscured due to color matching between the over-coating and the color of said spacer and/or adhesive.

In some embodiments, the step of partially coating the at least one bus bar with a substantially non-porous over-coating material comprises printing the ink using an inkjet printing method. In some embodiments, the inkjet printing method uses a piezo electric membrane. Some embodiments further comprise the step of curing the ink with UV lamps.

In some embodiments, the step of partially coating said at least one bus bar with a substantially non-porous over-coating material comprises printing the ink using a nozzle printing method. In some embodiments, the nozzle printing method dispenses the ink through a circular or slot type nozzle which can be programmed to follow the bus bar configuration. Some embodiments further comprise the step of curing the ink in a furnace. In some embodiments, the temperature of said furnace is set so that the temperature of the glass and EC films does not exceed about 200° C.

This invention is believed to increase the aesthetic appearance of EC IGU and guarantees robust durable performance in the field over the lifetime of the IGU.

DETAILED DESCRIPTION

A thin film electrochromic (EC) device used in architectural window applications changes tint from clear to dark upon the application of low-voltage DC power. The EC device is deposited on a glass substrate which is incorporated into an insulating glass unit (IGU). This invention provides enhancements to the electrochromic IGU.

Figure 1:
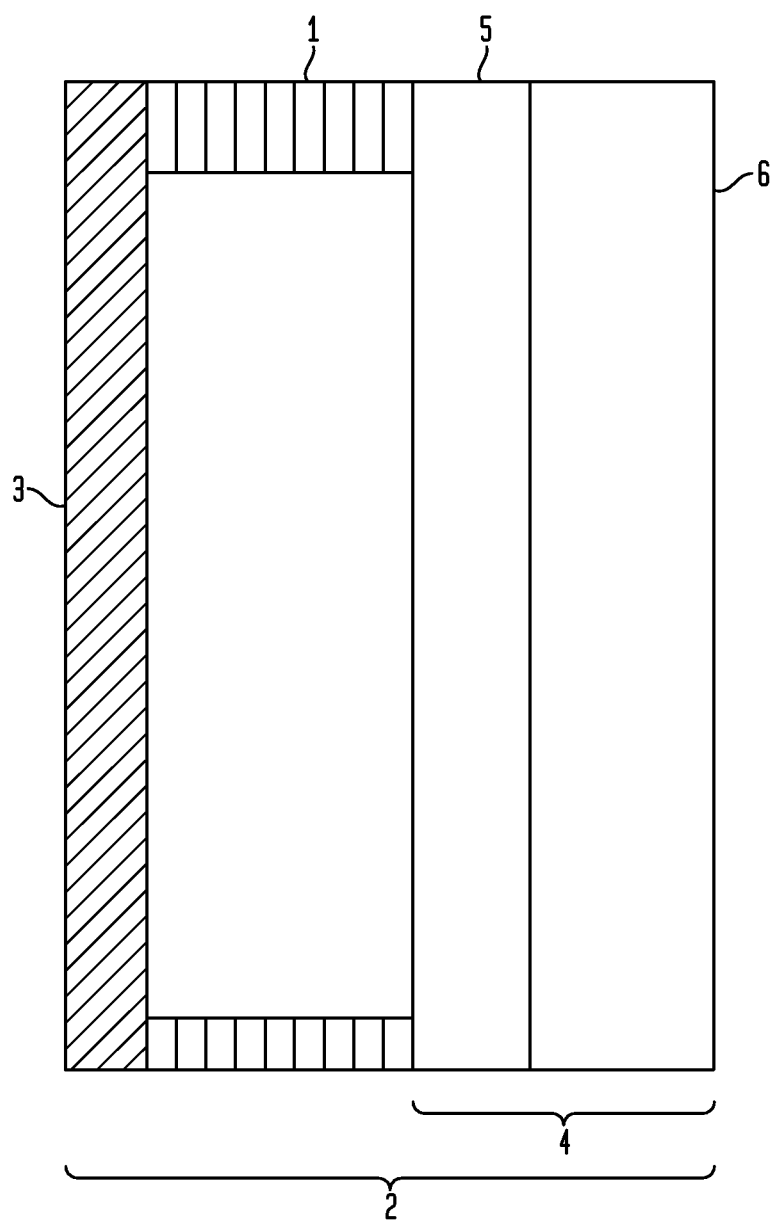
FIG. 1 is a cross-sectional view of an IGU comprising an EC device.
Figure 2:
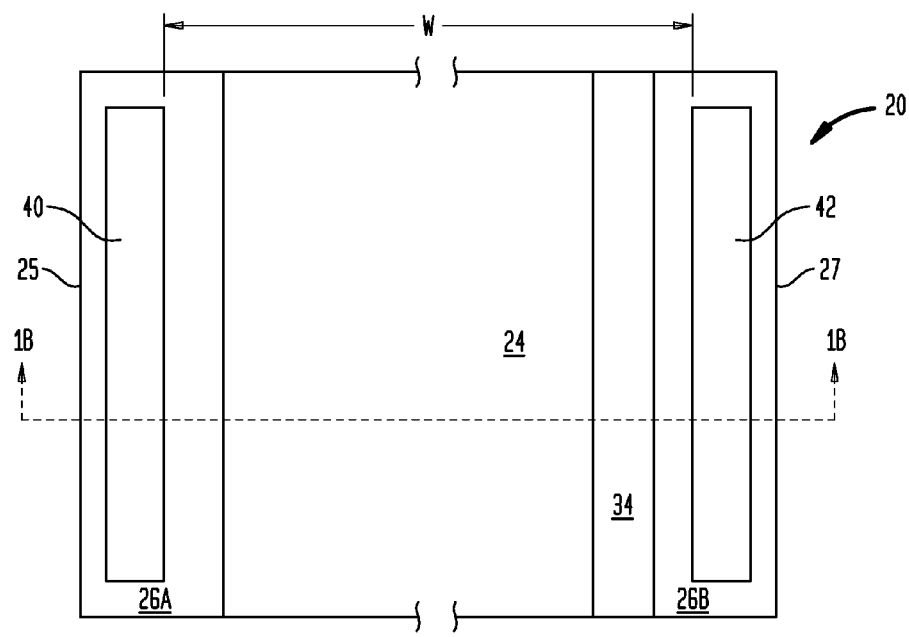
FIG. 2 is a perspective view of a traditional EC device.
Figure 3:
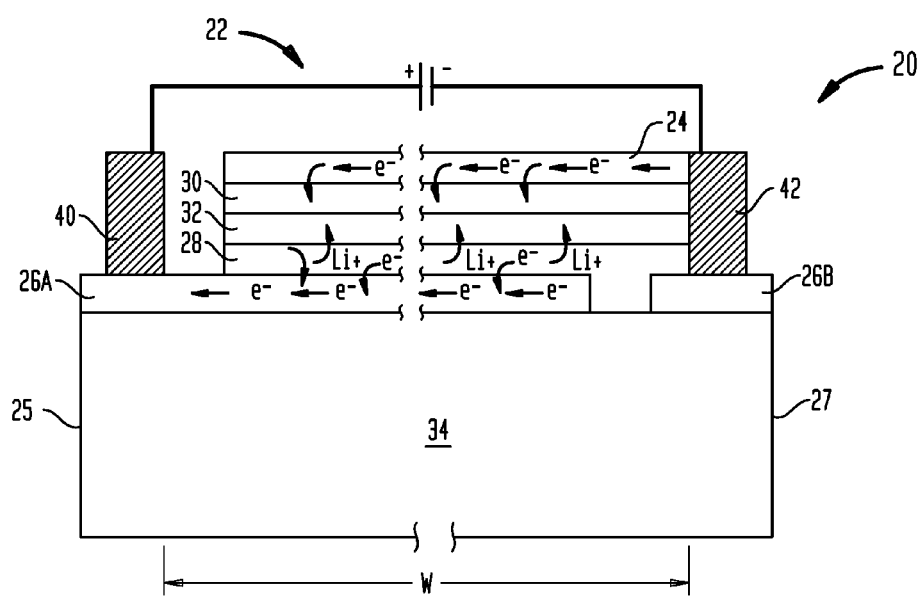
FIG. 3 is a cross-sectional view of a traditional EC device.
Figure 4:
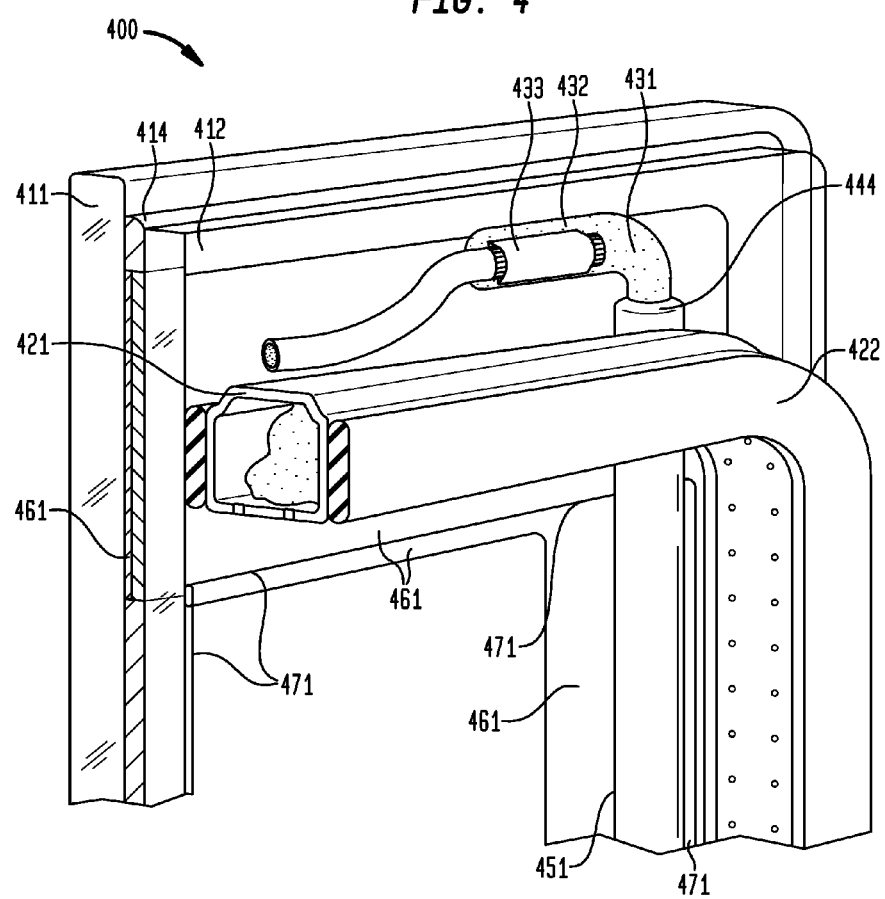
FIG. 4 is a cross-sectional view of the inventive IGU unit comprising an EC device.
Figure 5:
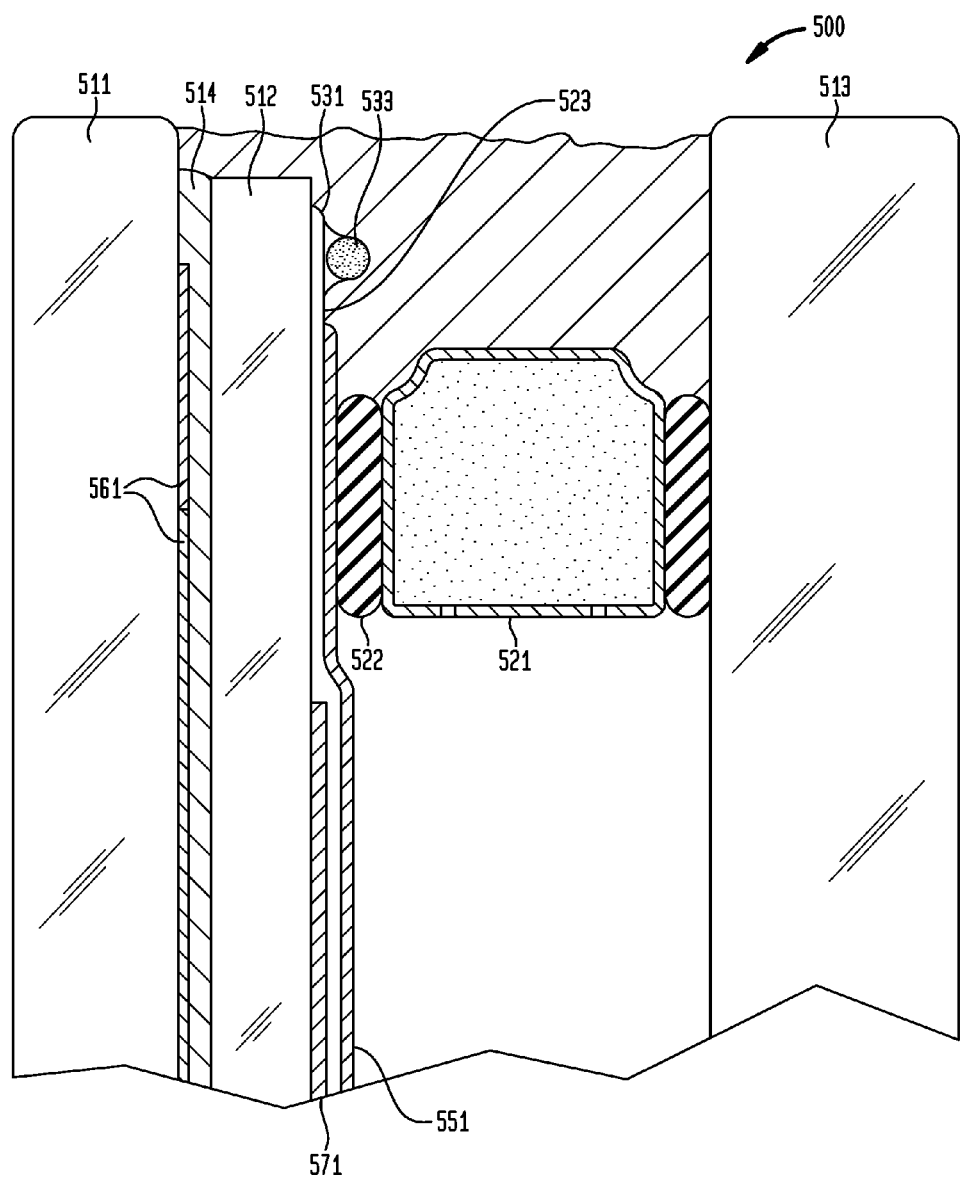
FIG. 5 is a cross-sectional view of the inventive IGU unit comprising an EC device.

FIGS. 4 and 5 illustrate the electrochromic IGU construction, bus bars, and specific features of the proposed invention. The electrochromic dual pane IGU consists of two glass substrates (lites) separated by an adhesively bonded spacer which completely traverses their perimeter and encloses the desiccated and inert gas filled space between the substrates. In some embodiments, the spacer and the adhesive polymer seal are black (but could be any other aesthetically attractive or functional color, shade or hue of black or grey). The electrochromic thin film coatings are deposited on one of the substrates. The substrate may be a laminate consisting of a device lite laminated to a support lite, such as those disclosed by U.S. patent application Ser. Nos. 13/178,065 and 13/040,787, herein incorporated by reference.

In some embodiments, there is an obscuration layer on the support lite that may be either a shade or hue of black or grey, or otherwise substantially color-matched to the spacer and/or adhesive (polymer seal material). In some embodiments, substantially color matched means within 80% of the color, wavelength, hue or shade of the spacer and/or adhesive. In some embodiments, substantially color matched means within 85% of the color, wavelength, hue or shade of the spacer and/or adhesive. In some embodiments, substantially color matched means within 90% of the color, wavelength, hue or shade of the spacer and/or adhesive. In some embodiments, substantially color matched means within 95% of the color, wavelength, hue or shade of the spacer and/or adhesive. In some embodiments, substantially color matched means within 97.5% of the color, wavelength, hue or shade of the spacer and/or adhesive. In some embodiments, substantially color matched means within 99% of the color, wavelength, hue or shade of the spacer and/or adhesive.

The obscuration layer blocks the transmission of stray light around the perimeter of the device. In some embodiments, the film stack on the device lite faces the desiccated space. In some embodiments, electrical connection to the EC films is achieved by thick film silver or silver containing bus bars that pass under the adhesively bonded spacer, and/or contact conductive EC layers inside the IGU. In some embodiments, some of the gray/silver colored bus bars are located adjacent to the black spacer inside the IGU. In some embodiments, other bus bars are more centrally located inside the IGU—not adjacent to the spacer, e.g. center bus bars.

In FIG. 4, a cross-sectional view of a preferred embodiment of the present invention is provided. An insulated glass unit 400 includes a support lite (pane) 411 and a device lite (pane) 412 separate by an interlayer laminate material 414. Around the inner perimeter of the support lite 411 and the device lite 412 is color obscuration material 461. A spacer 421 traverses the inner perimeter of the device lite 412 and is attached by an adhesive material or seal 422. The support lite 411 and device lite 412 further have electrochromic coatings 471.

The area bounded by the spacer and device lite defines an insulated area of the IGU suitable for inert gas storage. Further, the colored obscuration material 461 along the perimeter of the device lite obscures visibility of the spacer through the IGU.

A conductive bus bar 431 traverses one edge of the perimeter of the device lite 412 behind the color obscuration material 461. A portion of the bus bar 431 is thus within the insulated area of the IGU suitable for inert gas storage. The bus bar 431 also extends beyond the insulated area, such that the bus bar 431 passes underneath the spacer 422. The portion of the bus bar 431 not within the insulated area of the IGU has a bus bar solder tab 432 for locating the solder joint 433.

The bus bar 431 is coated with an over-coating material 451 that is 1) substantially non-porous; and 2) substantially color-matched to the color obscuration material 461, the spacer 421, the adhesive 422 (e.g. polymer seal material), and/or a combination thereof. It is believed that this material may achieve a robust dielectric isolation between the bus bar 431 and the spacer 422. In addition, the over-coating is substantially non-porous, decreasing the amount of inert gas escape, particularly in the area where the bus bar 431 goes under the spacer 422.

Further, the color of the over-coating material 451 is substantially color-matched to the obscuration material 461, which prevents the typically silver or metallic covered bus bar 431 from being visible through the IGU 400. In a preferred embodiment, the over-coating 451, color obscuration material 461 and adhesive 422 are black or a shade of black or grey, but may be tinted, e.g. grey with a hue of blue.

Further, the over-coating material 451 covers all or substantially all exposed bus bar 431 surfaces, including under the spacer 421, and further extends beyond the spacer by between 0.5 and 1.5 mm 444. The color-matched over-coating material 444 does not extend to the bus bar solder tab 432 or the solder joint 433. Thus, the over-coating 444 has functionality of a solder stop.

In FIG. 5, a cross-sectional view of a preferred embodiment of the present invention is provided. An insulated glass unit 500 has two glass substrates 511, 512, 513, 514 separated by a desiccant filled spacer 521. The first substrate is comprised of a support lite (pane) 511 and a device lite (pane) 512 adhered together by an interlayer laminate material 514. The second substrate comprises an IGU matching lite 513. The two glass substrates are connected to a desiccant filed spacer 521 by a primary IGU seal material 522. In between the two substrates is a desiccated gas filled cavity. The cavity may contain Argon or other inert gas.

A colored obscuration material 561 is disposed along the perimeter of the device lite 512 and the support lite 511 on the inner side (facing the desiccated gas filled cavity). Further, there is a bus bar 531 and electrochromics coatings 571 disposed on the inner side of the device lite 512. The bus bar 531 is disposed along the perimeter of the device lite 512 behind the color obscuration material 561. The bus bar 531 further has a bus bar solder tab 531 suitable for attaching a wire through formation of a solder joint, 533.

Further, disposed on the bus bar 531 is a color-matched over-coating material 551 that is 1) substantially non-porous; and 2) color-matched to either the color obscuration material 561, the primary IGU seal material 522, the spacer 521, or a combination thereof. The color-matching is believed to prevent the typically silver or metallic covered bus bar 531 from being visible through the IGU 500. In some embodiments, the over-coating 551, color obscuration material 561 and adhesive 522 are black or a shade of black or grey.

As seen from inside, the product fabrication and assembly is such that the apparently shiny silver bus bars may be seen with the black obscuration print in the background. The color difference may be striking and may attract attention. In some embodiments, the silver/gray bus bar is covered at least partially with a colored (e.g. black) overcoat ink substantially matching an obscuration ink.

It is believed that his colored ink may also provide electrical insulation to avoid electrical shorts due to undesired contacts between the bus bars and the metallic spacers of the IGU. In addition to that, it is believed that the black ink may substantially mask the porosity of the bus bars and increases the inert gas retention performances of the IGU. Also, the colored ink which extends under the spacer but does not cover the solder pads may serve as a solder stop preventing the solder from shorting the bus bar to the spacer.

Covering the silver bus bars with an opaque colored (e.g. black) ink is believed to improve the color matching of the different materials and light blocking layers seen by the customer from inside the building. It is desirable that the edges of the glass should not attract attention. In some embodiments, the colored ink may completely cover all exposed bus bar surfaces inside the IGU, under the spacer, and for a short distance (up to about 1 mm) beyond the spacer. It does not cover the external solder pad. In other embodiments, the colored ink coverage is less. For instance, in some embodiments, the colored ink completely covers all exposed bus bars surfaces inside the IGU, but does not extend beyond the spacer. In other embodiments, the ink does not extend under the spacer. In other embodiments, the ink covers substantially all but not all of the exposed bus bar surfaces, for example more than 75% but less than 100%.

In some embodiments, the black ink layer has to cover the silver bus bar layer as noted above. In some embodiments, this is achieved with automatic printing techniques which may cover bus bars of any configuration, e.g. for any size device without the use of screens and/or masks.

In some embodiments, the rheology of the colored ink must be suitable for the printing technique used. In some embodiments, the colored ink processing/drying/curing conditions must be compatible with the glass substrate, EC film, thin film materials employed, and bus bars.

The processing time must be compatible with production takt times. In some embodiments, colored ink must have excellent adhesion to the substrate, glass, polymer adhesive, bus bars, and EC thin film materials.

In some embodiments, the optical density of the cured colored ink must be greater than about 2 for sections of ink less than about 0.005" thick. This means that surfaces with an ink thickness of less than about 0.005" will reflect less than about 1% of light. In some embodiments, the colored ink must have excellent durability over the lifetime of the EC glazing.

In some embodiments, the colored ink is selected such that it cannot degrade the EC films or effect the functioning of the EC device over the lifetime of the device. In some embodiments, the colored ink should have excellent room temperature cycling, thermal cycling, and resistance to solar exposure. In some embodiments, the colored ink should have a low permeability to argon or other inert gases such that the diffusion of inert gas through the colored ink and subsequently through the bus bar to the exterior of the spacer is significantly reduced compared to inert gas diffusion through an uncoated bus bar.

In some embodiments, the colored ink must be a good electrical insulator so that it provides excellent isolation between the bus bar and the spacer. In this case the colored ink must be mechanically robust so that it is not deformed or penetrated e.g. when the IGU is mounted in a frame and the pressure plate is tightened compressing the polyisobutylene or other adhesive, polymer or sealant, and pressing the spacer against the colored ink covering the bus bar. In some embodiments, the colored ink should be an excellent solder mask material.

A first example of a bus bar coating ink is to use an organic ink which is substantially the same technology and color as the ink used to print the obscuration layer (on the inner side of the support lite). One example ink is acrylate based ink and is manufactured by Marabu, Tamm Germany. Other potential suppliers of similar inks are Nazdar and Lyson.

In some embodiments, the printing technology is digital printing of organic inks or inorganic inks (e.g. silicone inks or azo-dye based inks). This is believed to be a flexible method to automatically and accurately print patterns of any color on the glass. Each substrate can have different shapes, patterns, dimensions. That does not impact the cycle time or the quality of the printing. In some embodiments, no separate heat treatment is needed after printing other than the heat treatment steps used in the manufacture of the device itself. In some embodiments, the ink is cured during the printing process.

In some embodiments, the digital printing technology is a drop on demand technology. In some embodiments, the ink is jetted on the glass through a printhead, using a piezoelectric membrane. This way, the amount of ink jetted is controlled and stable and it allows an accurate positioning of the print on the glass. In some embodiments, the printheads are moving over the glass and ejecting ink drops only when needed. UV lamps may be used to cure the ink during the printing process. In some embodiments, they are located on both sides of the printheads. Compared to other digital printing machines, the patterns will be generated through software and printed automatically by the printer without any human action in between. A typical printer is a RS35 (3.5 m wide) from Polytype. In some embodiments, the ink is a modified silicone ink. The silicone ink meets all the performance requirements stated above. Its advantage is its excellent adhesion and abrasion resistance as well as its superior solder mask performance.

An alternative to the above mentioned inkjet technology and UV-cured ink is a colored ink that can be dispensed through a nozzle (same technique used for bus bars) and subsequently rapidly cured.

This material can be dispensed through a circular or slot-type nozzle which can be programmed to follow the bus bar configuration. The Heraeus colored ink can be cured after 4 minutes in an IR furnace. The furnace is set so that the temperature of the glass and EC films does not exceed 200 C.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system comprising an electrochromic device comprising:
 a polymer seal;
 a bus bar; and
 an over-coating material, wherein the over-coating material is:
  disposed between the bus bar and the polymer seal;
  substantially non-porous; and
  substantially color matched to one of an obscuration material, a spacer, or the polymer seal.

2. The system of claim 1, wherein said over-coating material is an ink.

3. The system of claim 2, further comprising a spacer, wherein said ink provides electrical insulation between said spacer and the bus bar.

4. The system of claim 3, wherein said ink masks a porosity of the bus bar and increases an inert gas retention performance.

5. The system of claim 4 wherein the over-coating material has an inert gas retention rate of at least about 90% over a period of about 30 days.

6. The system of claim 4, further comprising a solder pad, wherein said ink acts as a solder stop by not covering said solder pad.

7. The system of claim 6, wherein said ink completely covers all exposed surfaces of the bus bar in an insulated area of an IGU, under the spacer, and for a distance beyond said spacer.

8. The system of claim 7, wherein a distance that said ink covers the bus bar beyond said spacer is between 0.5 mm and 1.5 mm.

9. The system of claim 6, wherein said ink is selected from the group consisting of an organic acrylate ink and a modified silicone ink.

10. The system of claim 9, wherein said ink has an optical density greater than about 2 for thin sections less than about 0.005" thick.

11. The system of claim 6, wherein said bus bar comprises a material that includes silver.

12. The system of claim 11, wherein said bus bar is metallic or silver in color.

13. The system of claim 12, wherein said bus bar is substantially color matched to said spacer.

14. The system of claim 13, wherein said bus bar is porous.

15. The system of claim 13, wherein said bus bar is centrally located within an IGU.

16. An insulated glass unit comprising an electrochromic device having at least two bus bars, a polymer seal, and a color obscuration material, wherein:
 said at least two bus bars are porous and coated with an over-coating material that is substantially non-porous and substantially color-matched to the color obscuration material; and the over-coating material is disposed between the polymer seal and the at least two bus bars.

17. The insulated glass unit of claim 16, wherein said non-porous color-matched over-coating material is an ink.

18. The insulated glass unit of claim 17, further comprising at least one spacer, wherein said ink provides electrical insulation between said at least two bus bars and at least one of said at least one spacer.

19. The insulated glass unit of claim 18, wherein said ink masks the porosity of the at least two bus bars and increases an inert gas retention performance.

20. The insulated glass unit of claim 19, wherein said ink is black or a shade of black.

21. The insulated glass unit of claim 19, further comprising a solder pad, wherein said ink acts as a solder stop by not covering said solder pad.

22. The insulated glass unit of claim 21, wherein said ink completely covers all exposed surfaces of the at least two bus bars in an insulated area of an IGU, under the spacer, and for a distance beyond the spacer.

23. The insulated glass unit of claim 22, wherein said distance that said ink covers beyond said spacer is between 0.5 mm and 1.5 mm.

24. The insulated glass unit of claim 21, wherein said ink selected from the group consisting of an organic acrylate ink and a modified silicone ink.

25. The insulated glass unit of claim 24, wherein said ink has an optical density greater than about 2 for thin sections less than about 0.005" thick.

26. The insulated glass unit of claim 21, wherein said at least two bus bars comprise a material that includes silver.

27. The insulated glass unit of claim 26, wherein said at least two bus bars are metallic or silver in color.

28. The insulated glass unit of claim 27, wherein said at least two bus bars are centrally located within the IGU.

29. A method of increasing an inert gas retention performance of an electrochromic device including a bus bar and a color obscuration material comprising:
at least partially coating said bus bar with an over-coating material that is substantially non-porous; and substantially color-matched to said color obscuration material; and
placing a polymer seal adjacent to the over-coating material, such that the bus bar and over-coating layer extend from a sealed interior portion to locations outside the interior region and spaced apart from the polymer seal.

30. The method of claim 29, wherein said substantially non-porous over-coating material is selected from the group consisting of an organic acrylate based ink and a modified silicone ink.

31. The method of claim 30, wherein said inert gas retention is at least about 90% over about 30 days.

32. The method of 30, wherein said electrochromic device further includes a spacer, and wherein said over-coating material is substantially color-matched to said spacer.

33. The method of claim 32, wherein the step of partially coating said bus bar with a substantially non-porous over-coating material comprises printing the ink using an inkjet printing method.

34. The method of claim 33, wherein said inkjet printing method uses a piezoelectric membrane.

35. The method of claim 34, further comprising the step of curing the ink with UV lamps.

36. The method of claim 32, wherein the step of partially coating said bus bar with a substantially non-porous over-coating material comprises printing the ink using a nozzle printing method.

37. The method of claim 36, wherein said nozzle printing method dispenses the ink through a circular or slot nozzle.

38. The method of claim 37, wherein printing the ink is performed using a program such that printing follows the bus bar configuration.

39. The method of claim 38, further comprising the step of curing the ink in a furnace so that a temperature of the glass and EC films does not exceed about 200° C.

40. A system comprising an electrochromic device comprising:
a substrate;
a polymer seal having a first end at a gas filled cavity and a second end opposite the first end;
a bus bar disposed between the substrate and polymer seal, wherein the bus bar extends from within the gas filled cavity to beyond the second end of the polymer seal;
an over-coating material coated over the bus bar, wherein the over-coating material is substantially non-porous and substantially black or a shade of black or grey.

41. The system of claim 40, wherein the bus bar includes pores.

42. The system of claim 40, further comprising a solder joint attached to the bus bar, wherein the solder joint is:
spaced part from the over-coating material and the polymer seal; and
closer to the second end of the polymer seal than the first end of the polymer seal.

* * * * *